(12) United States Patent
Place

(10) Patent No.: US 9,221,102 B2
(45) Date of Patent: Dec. 29, 2015

(54) PORTABLE MACHINING APPARATUS TOOL MODULE

(75) Inventor: Brent K. Place, Hager City, WI (US)

(73) Assignee: Actuant Corporation, Menomonee Falls, WI (US)

( * ) Notice: Subject to any disclaimer, the term of this patent is extended or adjusted under 35 U.S.C. 154(b) by 148 days.

(21) Appl. No.: 13/988,507

(22) PCT Filed: Nov. 22, 2011

(86) PCT No.: PCT/US2011/061857
§ 371 (c)(1),
(2), (4) Date: May 20, 2013

(87) PCT Pub. No.: WO2012/071419
PCT Pub. Date: May 31, 2012

(65) Prior Publication Data
US 2013/0239762 A1    Sep. 19, 2013

Related U.S. Application Data

(60) Provisional application No. 61/416,956, filed on Nov. 24, 2010.

(51) Int. Cl.
*B23B 5/16* (2006.01)
*B23B 3/22* (2006.01)
*B23B 3/26* (2006.01)
*B23D 21/04* (2006.01)

(52) U.S. Cl.
CPC ... *B23B 3/22* (2013.01); *B23B 3/26* (2013.01); *Y10T 82/22* (2015.01)

(58) Field of Classification Search
CPC ............ B23B 5/16; B23B 5/14; B23B 5/163; B23B 5/167
USPC ..................................................... 82/113, 128
See application file for complete search history.

(56) References Cited

U.S. PATENT DOCUMENTS

| 4,739,685 A * | 4/1988 | Ricci ............................... 82/113 |
| 4,813,314 A * | 3/1989 | Kwech ............................ 82/113 |
| 4,823,655 A * | 4/1989 | VanderPol ...................... 82/113 |
| 4,944,205 A * | 7/1990 | Ricci ............................... 82/113 |
| 6,912,939 B1* | 7/2005 | Place .............................. 82/113 |
| 2010/0162860 A1* | 7/2010 | Hall et al. ....................... 82/113 |

* cited by examiner

*Primary Examiner* — Will Fridie, Jr.
(74) *Attorney, Agent, or Firm* — Michael Best & Friedrich LLP

(57) ABSTRACT

A tool module for a machining apparatus including a rotatable portion. The tool module includes at least one adjustment clamp supported by the rotatable portion. A module base is supported by the at least one adjustment clamp and defines a linear movement track. A tool slide is configured to support a cutting tool and is movable along the linear movement track. The at least one adjustment clamp is movable from a release position to a locking position and vice versa, and in both the release position and the locking position the at least one adjustment clamp is connected to the rotatable portion. In the release position the at least one adjustment clamp permits the module base to translate relative thereto, and in the locking position the at least one adjustment clamp engages the module base to inhibit the module base from moving relative thereto.

20 Claims, 8 Drawing Sheets

PORTABLE MACHINING APPARATUS TOOL MODULE

CROSS-REFERENCE TO RELATED APPLICATION

This application claims the benefit of U.S. Provisional Patent Application No. 61/416,956 filed Nov. 24, 2010, the disclosure of which is hereby incorporated by reference in its entirety.

STATEMENT CONCERNING FEDERALLY SPONSORED RESEARCH OR DEVELOPMENT

Not applicable.

FIELD OF THE INVENTION

This invention relates to portable machining lathes, and particularly cutting tool support modules of clamshell lathes.

BACKGROUND OF THE INVENTION

Some components, such as piping that may be part of a pipeline, building, plant machinery, ship, or other structures and devices, are assembled, repaired, or reconditioned in place due to their size, location, accessibility, or the like. Such processes typically include cutting off pipes, preparing pipe joints for welding, and forming welds at piping junctures. One method of cutting off pipes is to use a cutting tool mounted to a "clamshell". Clamshells are portable pipe lathes that are connected to the outside of the pipe in which the cutting tool moves around the outside perimeter of the pipe to cut the outside of the pipe. The cutting tool can also be advanced radially relative to the pipe as it moves around the outside perimeter of the pipe.

Despite the cutting tool's ability to translate radially relative to the pipe, clamshell modules that support cutting tools are not typically easy to otherwise adjust once connected to the piping structure. That is, the cutting tool is usually connected to the clamshell by a set of fasteners that extend through a base that translatably supports the cutting tool. If the base is to be repositioned relative to the clamshell, e.g., to provide a different range over which the cutting tool translates, the set of fasteners needs to be completely detached from the base and the clamshell and subsequently replaced. This can be especially problematic when operating on pipes in nuclear reactors because maintenance personnel may only work in radioactively "hot" areas for extremely short time periods. Accordingly, it is desirable to have a clamshell lathe tool support module in which one or more adjustments can be made in a minimal amount of time.

Moreover, previous cutting tool support modules are typically constructed so that replacement or repair of relatively small parts requires replacement or overhaul of a significant portion of the device. Accordingly, it is desirable to have a clamshell lathe tool support module in which one or more components can be removed and replaced with relative ease.

What is needed in the art is an apparatus for machining an exterior surface of a component, particularly piping, that addresses one or more of the drawbacks of previous clamshell lathes described above.

SUMMARY OF THE INVENTION

In one aspect, the present invention provides a tool module for a machining apparatus. The machining apparatus includes a clamshell having a stationary portion configured to be supported by a workpiece and rotatably supporting a rotatable portion. The tool module comprises at least one adjustment clamp supported by the rotatable portion of the clamshell. A module base is supported by the at least one adjustment clamp and defines a linear movement track that extends radially relative to the clamshell. A tool slide is configured to support a cutting tool and is movable along the linear movement track. The at least one adjustment clamp is movable in an axial direction relative to the clamshell from a release position to a locking position and vice versa, and in both the release position and the locking position the at least one adjustment clamp is connected to the rotatable portion of the clamshell. In the release position the at least one adjustment clamp permits the module base to translate relative thereto, and in the locking position the at least one adjustment clamp engages the module base to inhibit the module base from moving relative thereto.

In another aspect, the present invention provides an apparatus for machining a workpiece. The apparatus comprises a stationary portion configured to connect to and extend around the workpiece. A rotatable portion is rotatably supported by the stationary portion and is configured to extend around the workpiece. At least a first adjustment clamp is supported by the rotatable portion, and a module base is supported by the first adjustment clamp. The module base defines a linear movement slot. The apparatus further includes a tool slide configured to support a cutting tool for machining the workpiece. The tool slide is movable within the linear movement slot. The first adjustment clamp is movable from a release position to a locking position and vice versa when connected to the rotatable portion. In the release position the first adjustment clamp permits the module base to translate relative thereto, and in the locking position the first adjustment clamp engages the module base to inhibit the module base from moving relative thereto.

In yet another aspect, the present invention provides a tool module for a machining apparatus. The machining apparatus includes a clamshell having a stationary portion rotatably supporting a rotatable portion. The tool module comprises a module base supported by the rotatable portion of the clamshell and defining a linear movement slot. A tool slide is configured to support a cutting tool and is movable within the linear movement slot. The tool slide also defines a feed nut recess having an open face. A feed nut is supported in the feed nut recess, and a feed screw is rotatably supported by the feed nut and is rotatable to translate the feed nut and the tool slide within the linear movement slot. The tool module further includes a feed nut bracket disposed proximate the feed nut and within the linear movement slot. The feed nut bracket extends across the open face of the feed nut recess to reinforce the tool slide.

The foregoing and objects and advantages of the invention will appear in the detailed description that follows. In the description, reference is made to the accompanying drawings that illustrate a preferred embodiment of the invention.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENT

Figure 1:
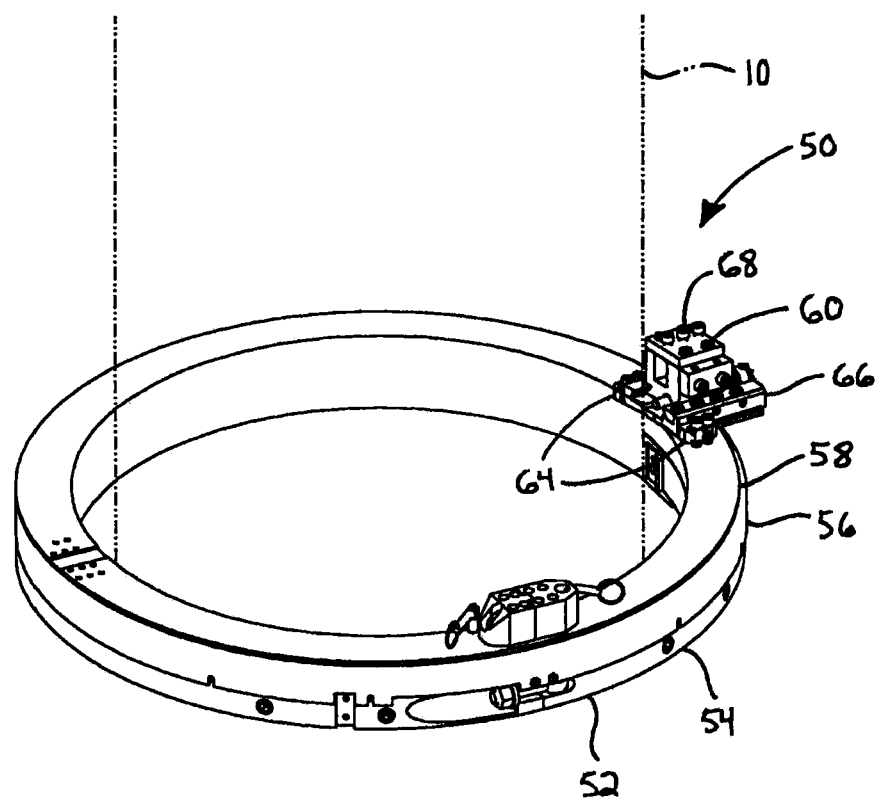
FIG. 1 is a perspective view of a clamshell lathe connected to a pipe and supporting a tool module according to the present invention.

Referring first to FIG. 1, a machining apparatus 50 connects to a generally cylindrical workpiece 10 (e.g., a pipe) having a weld crown or other work surface. The machining apparatus 50 includes a portable pipe lathe or clamshell 52 as is described in, e.g., U.S. Pat. Nos. 4,739,685, 4,939,964, 5,549,024 and/or 6,619,164, the disclosures of which are hereby incorporated by reference. The clamshell 52 may alternatively take the form of other embodiments that are not described in the above references. In the case of the former, the clamshell 52 generally includes a stationary portion 54 fixedly connected to the pipe 10 and a ring gear housing 56, each of which include adjoining semicircular segments that allow them to be positioned circumferentially around the pipe 10. The stationary portion 54 and the ring gear housing 56 are joined together by bearings internal to the construction (not shown). As such, a rotatable portion 58 supported by the ring gear housing 56 can be made to spin about the central axis of the stationary portion 54 when the ring gear is driven by a motor driven gear.

Figure 2:
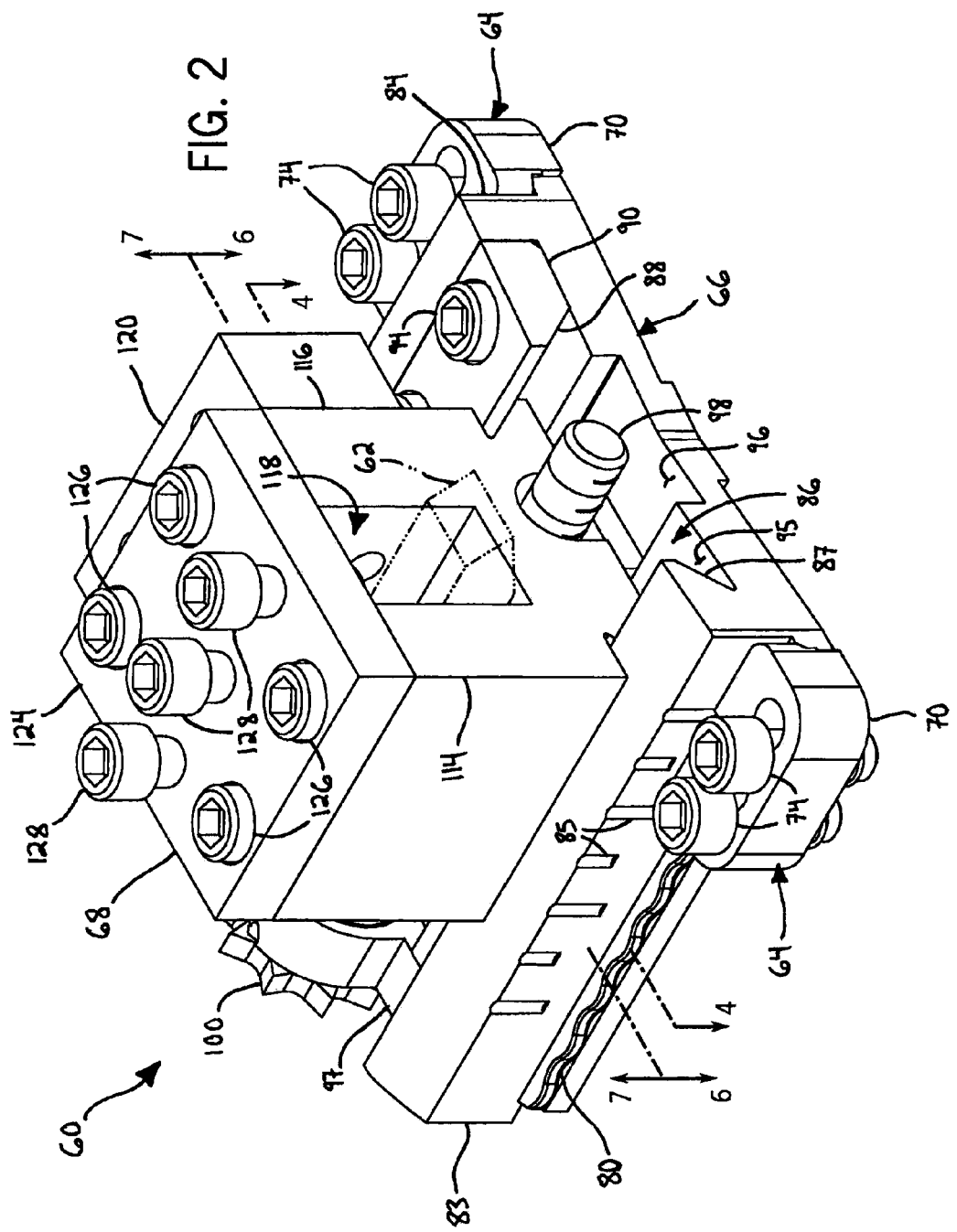
FIG. 2 is a top perspective view of the tool module of the clamshell lathe of FIG. 1.
Figure 3:
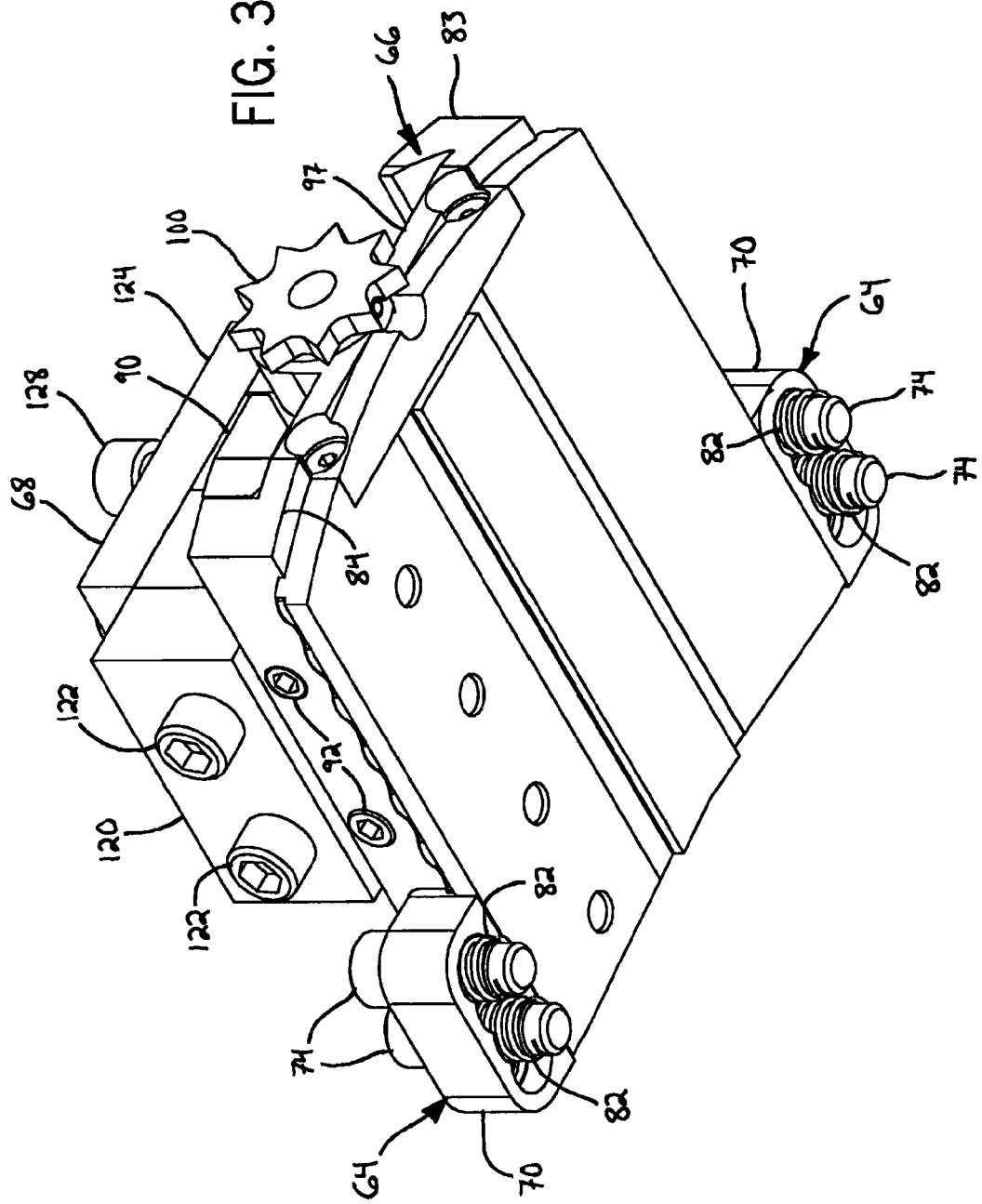
FIG. 3 is a bottom perspective view of the tool module of FIG. 1.

Referring now to FIGS. 1 and 2, a cutting tool support module 60 is supported by the rotatable portion 58. The cutting tool support module 60 supports a cutting tool 62 and, as such, the cutting tool 62 travels around and cuts a weld crown (or other work surface) on the pipe 10 as the rotatable portion 58 rotates relative to the pipe 10. In general, the tool module 60 includes a set of adjustment clamps 64 that connect a module base 66 to the rotatable portion 58. The module base 66 supports a tool slide 68 that mounts the cutting tool 62, and, during operation, the tool slide 68 may be translated along the module base 66 to displace the cutting tool 62 radially relative to the pipe 10. Advantageously, at least some components of the tool slide 68 are easily detachable and replaceable so that the entire tool slide 68 need not be replaced due to wear or damage. In addition, the adjustment clamps 64 are easily releasable to permit the module base 66 to be quickly translated relative to the rotatable portion 58, thereby permitting the tool slide 68 to translate over different ranges. These aspects and the structure of the tool module 60 are described in further detail in the following paragraphs, beginning with the adjustment clamps 64 and concluding with the tool slide 68.

Referring to FIGS. 2-5, the adjustment clamps 64, as the name implies and as described briefly above, permit selective adjustment of the module base 66 relative to the rotatable portion 58. The clamps 64 are disposed on opposite sides of the module base 66 in mirrored relation to one another and, other than their respective positions and orientations, are generally identical to each other. As such, only one of the adjustment clamps 64 is described in detail herein.

Figure 4:
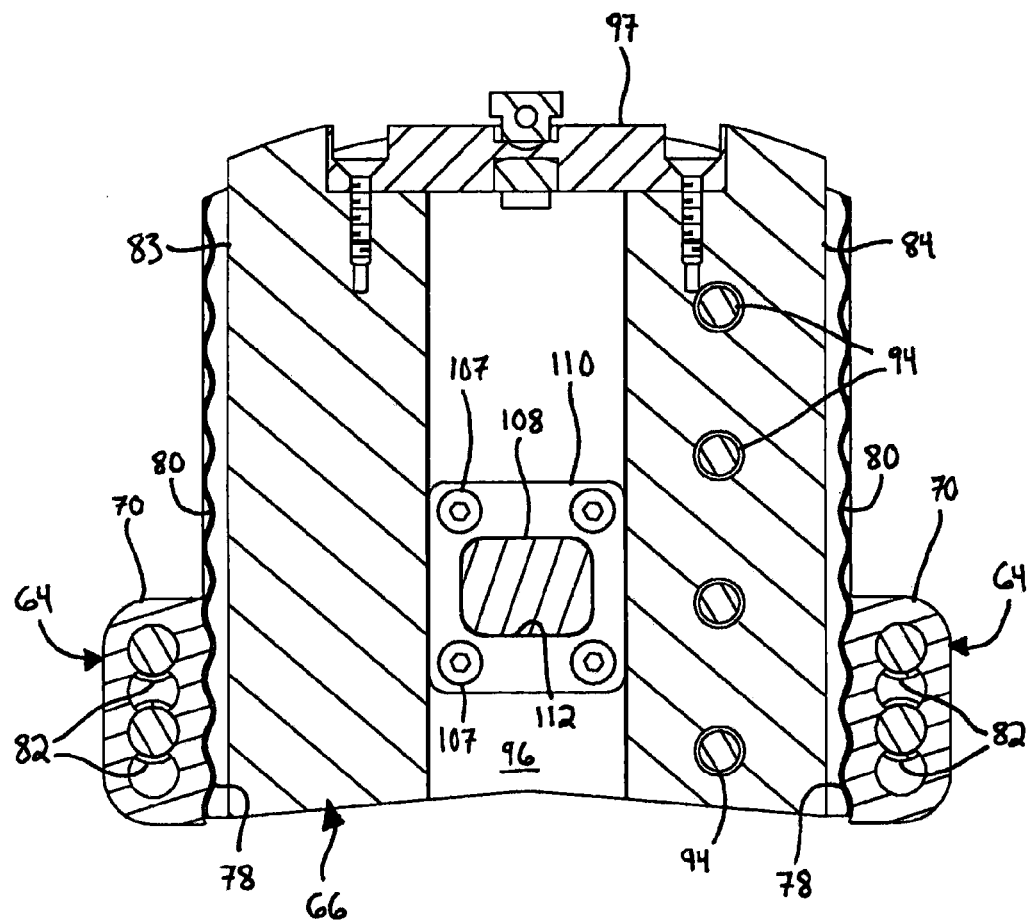
FIG. 4 is a sectional view along line 4-4 of FIG. 1 illustrating a feed nut and a feed nut bracket of the tool module.
Figure 5:
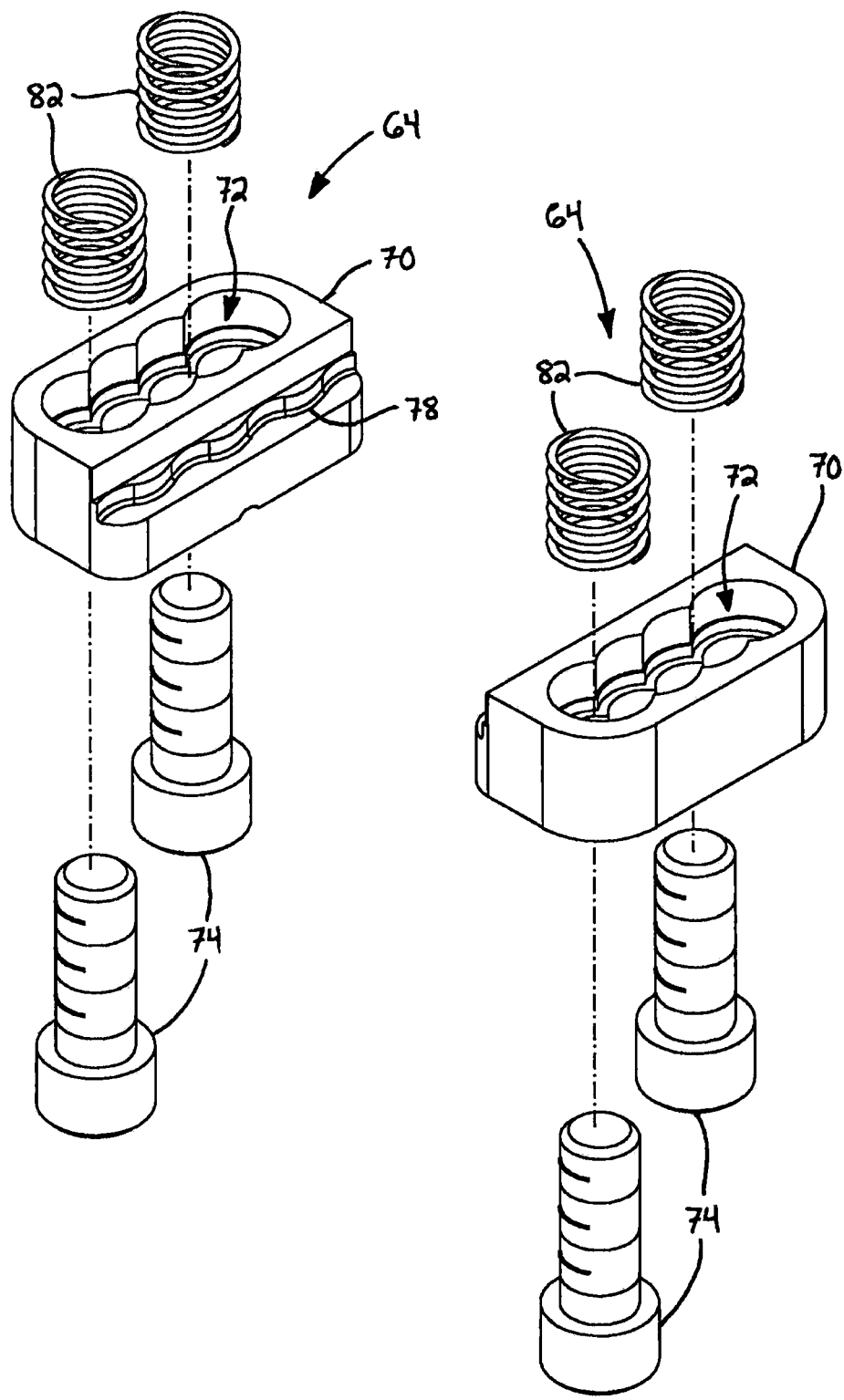
FIG. 5 is an exploded perspective view of two adjustment clamps of the tool module of FIG. 1.
Figure 6:
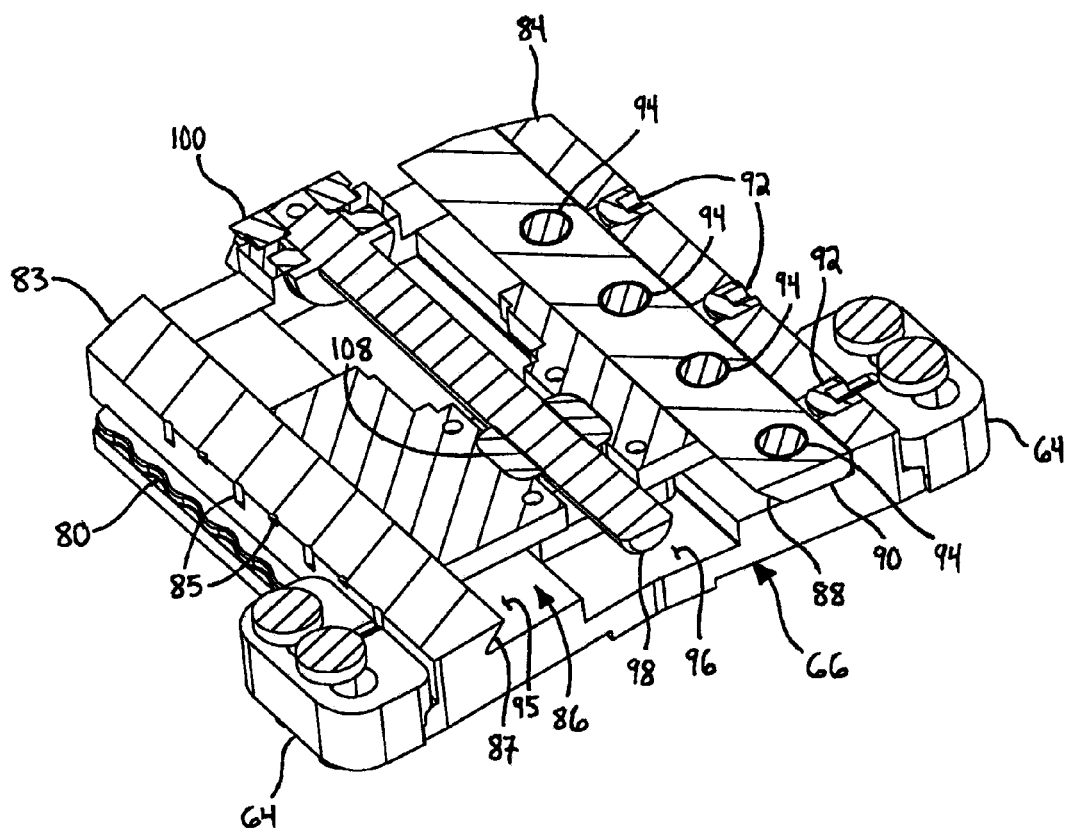
FIG. 6 is a perspective section view along line 6-6 of FIG. 1 illustrating a feed screw that drives a feed nut and a tool slide of the tool module.
Figure 7:
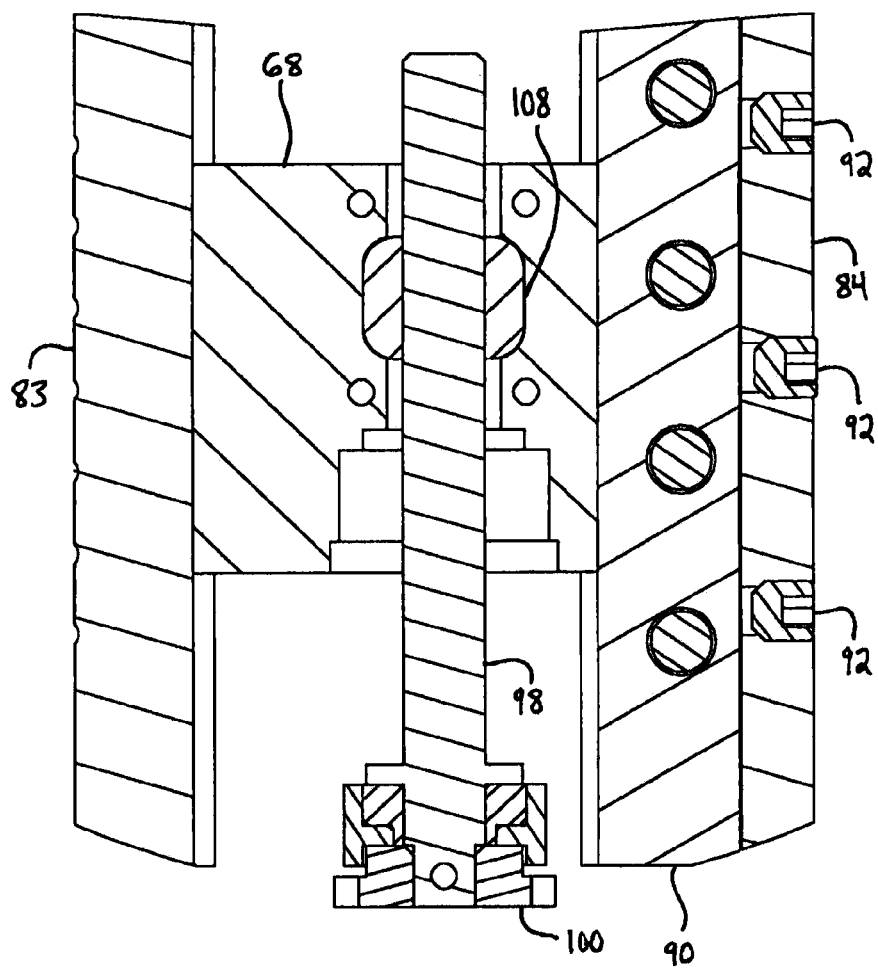
FIG. 7 is a sectional view along line 7-7 of FIG. 1 further illustrating the feed screw, the feed nut, and the tool slide.

As shown most clearly in FIGS. 4 and 5, the adjustment clamp 64 includes a clamp body 70 having passageways 72 that receive threaded fasteners 74. The passageways 72 are sized to permit the shank of the fasteners 74 to extend therethrough. As such, the fastener shanks connect to bolt holes (not shown) on the rotatable portion 58 of the clamshell 52. The heads of the fasteners 74, however, are oversized relative to the passageways 72 and do not extend therethrough. As a result, the fasteners 74 secure the clamp body 70 to the rotatable portion 58.

A different number of passageways 72 may be defined by the clamp body 70 than that shown in the figures. The number of passageways 72 may equal the number of fasteners 74 provided, although there are preferably more passageways 72 to permit the clamp 64 to connect to clamshells 52 having different bolt hole patterns. Similarly, the spacing between the passageways 72 may also be modified to correspond to bolt hole patterns of different clamshells 52.

In any case, when the fasteners 74 are tightened a sufficient amount, the clamp body 70 engages the module base 66 to inhibit movement of the module base 66 relative to the rotatable portion 58 of the clamshell 52. To further facilitate such a "locking" feature, the clamp body 70 includes a locking surface 78 disposed on the side proximate the module base 66. The locking surface 78 interfaces with an inverse locking surface 80 on the module base 66. Due to their matching shapes, the locking surfaces 78, 80 overlap and interdigitate in distinct locations of the module base 66 relative to the adjustment clamp 64. In these distinct locations, contact of the locking surfaces 78, 80 inhibits the module base 66 from moving relative to the adjustment clamp 64.

As shown in the figures, the locking surfaces 78, 80 preferably have scalloped or sinusoidal-like shapes. As an exemplary alternative, other identical shapes may instead be used, or non-identical shapes may be used provided that they define a plurality of distinct locations in which the module base 66 may be locked relative to the adjustment clamp 64.

Regardless of the specific shape that is used, the locking surfaces 78, 80 can be disengaged to "unlock" the module base 66 and thereby permit its adjustment. To this end, each of the fastener shanks mounts a compression spring 82 between the rotatable portion 58 of the clamshell 52 and the clamp body 70. The compression springs 82 thereby bias the clamp body 70 away from the rotatable portion 58. The fasteners 74 can be loosened by a small amount (e.g., about two turns) to permit the compression springs 82 to force the clamp body 70 toward a "release" position in which the clamp locking surface 78 disengages the base locking surface 80. In such a release position, the module base 66 is unlocked and free to translate relative to the clamp 64 and the rotatable portion 58. The module base 66 may then be locked by tightening the fasteners 74 and thereby moving the clamp body 70 such that the locking surfaces 78, 80 engage each other. Of course, the clamp body 70 may only be returned to such a "locking" position in one of the distinct locations in which the locking surfaces 78, 80 overlap and interdigitate (e.g., the location shown in FIG. 4).

Referring to FIGS. 2-4, 6, and 8, the module base 66 will now be described in further detail. The module base 66 is a generally flat component having side walls 83, 84 that engage the adjustment clamps 64. In particular, the side walls 83, 84 include the locking surfaces 80 described above. One or both of the side walls 83, 84 also includes markers or indentations 85 that demark the distinct locking locations in which the locking surfaces 78, 80 may be engaged.

Between the side walls 83, 84, the module base 66 includes several features that define a linear movement track 86 in which the tool slide 68 moves. One of the side walls 83 integrally connects to an angled surface 87 that defines one side of the linear movement slot 86. The other side of the linear movement slot 86 is defined by an angled surface 88 of a detachable and adjustable gib 90. Together, the angled surfaces 87, 88 create half of a single-angle dovetail joint that prevents the tool slide 68 from falling laterally out of the linear movement track 86. As an exemplary alternative, the angled surfaces 87, 88 may have sideways V-shapes to provide a double-angle dovetail joint. A single-angle dovetail joint is preferred, however, because such a construction provides more surface area over which cutting reaction forces are distributed as the angled surfaces wear.

For any type of dovetail joint, the detachable gib 90 may be adjusted as the angled surfaces 87, 88 wear due to sliding contact with the tool slide 68. This is achieved by rotating set screws 92 (FIGS. 3 and 6) that extend through the side wall 84 and abut the gib 90. Fasteners 94 are then tightened to secure the gib 90 relative to other portions of the module base 66.

As an exemplary alternative, both angled surfaces 87, 88 could be part of adjustable gibs 90. However, the construction described above is preferred because only a single gib 90 must be adjusted as the angled surfaces 87, 88 wear due to sliding contact with the tool slide 68. Furthermore, only a single set of set screws 92 and gib fasteners 94 are provided in the case of a single adjustable gib 90.

The linear movement slot 86 of the module base 66 is further defined by a base surface 95 adjacent the angled surfaces 87, 88. The base surface 95 is divided by a recessed surface 96 that provides space for components of the tool slide 68 as described in further detail below.

Still referring to FIGS. 2-4, 6, and 8, the module base 66 further includes a bearing block 97 that rotatably supports a feed screw 98 in the linear movement slot 86. Rotation of the feed screw 98 translates both the tool slide 68 and the cutting tool 62 relative to the module base 66. The feed screw 98 supports a starwheel 100 that may be used with a tripper mechanism (not shown), such as the tripper mechanism described in U.S. Pat. No. 5,884,618, e.g., to advance the cutting tool 62 upon each revolution of the rotatable portion 58.

Figure 8:
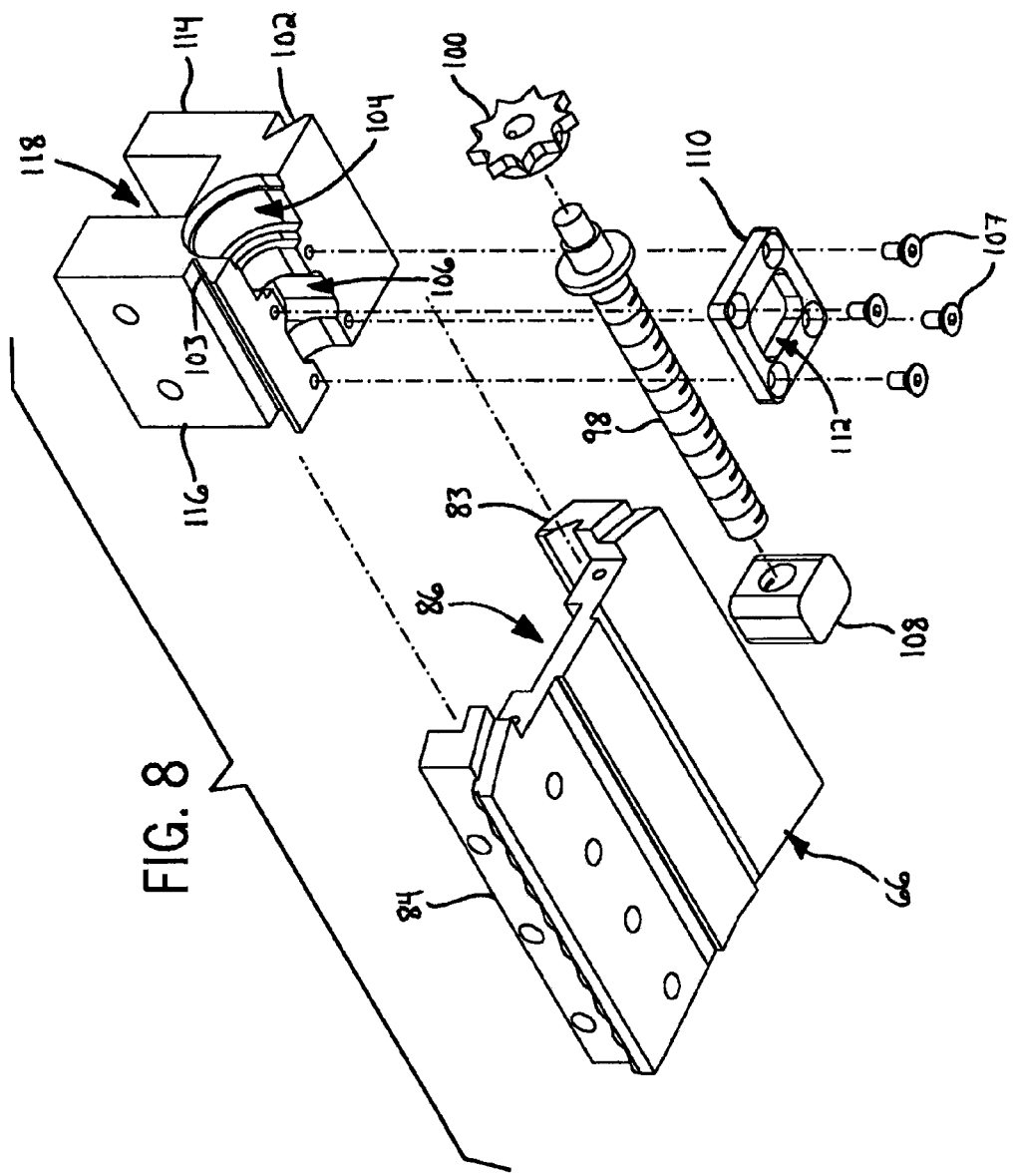
FIG. 8 is an exploded view of the tool module of FIG. 1 illustrating the feed screw, the feed nut, the tool slide, a feed nut bracket, and a module base; other components are hidden for clarity.

Referring now to FIGS. 2-4 and 6-8 and particularly FIG. 8, the tool slide 68 will now be described in further detail. The tool slide 68 is a generally block-shaped component having lower angled surfaces 102, 103 that engage the angled surfaces 87, 88, respectively, of the module base 66 to complete the dovetail joint. Like the angled surfaces 87, 88, the angled surfaces 102, 103 may have a sideways V-shape to provide a double-angle dovetail joint, although a single-angle dovetail is preferred for the same reason described above.

The tool slide 68 also includes a lower recess 104 between the angled surfaces 102, 103 to accommodate the feed screw 98. The lower recess 104 comprises a feed nut recess 106 that receives a feed nut 108. The feed nut 108 threadably receives the feed screw 98 and, as such, rotation of the feed screw 98 translates the feed nut 108 and the tool slide 68 along the linear movement slot 86 of the module base 66.

To reinforce the tool slide 68, a feed nut bracket 110 is mounted across the open face of the feed nut recess 106 and proximate the recessed surface 96 of the module base 66. The feed nut bracket 110 is a generally three-dimensional rectangular component that includes a through hole 112 to partially receive the feed nut 108. Together with the module base 66, the feed nut bracket 110 holds the feed nut 108 in place within the feed nut recess 106. However, the feed nut bracket 110 is detachably connected to the tool slide 68 (e.g., via fasteners 107) to permit the feed nut 108 to be easily replaced in the case of wear.

Above the lower recess 104 and the angled surfaces 102, 103, the tool slide 68 includes features for mounting the cutting tool 62 and, optionally, machining attachments. In particular, the tool slide 68 includes side walls 114, 116 that define a tool receiving recess 118 there between. One of the side walls 116 detachably connects to an attachment adapter 120 via fasteners 122. The attachment adapter 120 includes upper threaded holes (not shown) to connect to common machining attachments, such as counterbore attachments, swivel head attachments, and the like.

Above the attachment adapter 120, a cover 124 detachably connects to the side walls 114, 116 via fasteners 126. The cover 124 supports fasteners 128 that are tightened to extend through the cover 124, engage the cutting tool 62, and thereby secure the cutting tool 62 within the recess 118. Alternatively, the fasteners 128 may engage shims (not shown) positioned in the recess 118 in addition to the cutting tool 62 if the cutting tool 62 is relatively short.

From the above disclosure, it should be apparent that the present invention, in some embodiments, provides a clamshell lathe tool module in which one or more components can be removed and replaced with relative ease. In some embodiments, the present invention additionally or alternatively provides a clamshell lath tool module in which one or more adjustments can be made in a minimal amount of time.

A preferred embodiment of the invention has been described in considerable detail. Many modifications and variations to the preferred embodiment described will be apparent to a person of ordinary skill in the art. Therefore, the invention should not be limited to the embodiment described, but should be defined by the claims that follow.

I claim:

1. A tool module for a portable machining apparatus, the machining apparatus including a clamshell having a stationary portion configured to be supported by the workpiece and rotatably supporting a rotatable portion, the tool module comprising:
at least one adjustment clamp supported by the rotatable portion of the clamshell, the at least one adjustment clamp having a clamp locking surface;
a module base supported by the at least one adjustment clamp and defining a linear movement track that extends radially relative to the clamshell, the module base having a base locking surface, the base locking surface being configured to translate with respect to the clamp locking surface between a plurality of positions; and
a tool slide configured to support a cutting tool and being movable along the linear movement track;
wherein the at least one adjustment clamp is movable in an axial direction relative to the clamshell from a release position to a locking position and vice versa, in both the release position and the locking position the at least one adjustment clamp being connected to the rotatable portion of the clamshell, in the release position, the at least one adjustment clamp permitting the base locking surface and the clamp locking surface to translate relative to each other between the plurality of positions, and, in the locking position, the clamp locking surface engaging the base locking surface to inhibit the module base from moving relative to the at least one adjustment clamp.

2. The tool module of claim 1, wherein the at least one adjustment clamp includes:
a clamp body engaging the module base in the locking position;

at least one fastener connecting the clamp body to the rotatable portion of the clamshell; and at least one biasing device biasing the clamp body toward the release position.

3. The tool module of claim 2, wherein the clamp body includes the clamp locking surface, and wherein the clamp locking surface and the base locking surface overlap at distinct locations of the module base relative to the at least one adjustment clamp to provide distinct locations at which the at least one adjustment clamp is movable to the locking position.

4. The tool module of claim 3, further comprising a plurality of markers, each of the markers being aligned with one of the distinct locations at which the at least one adjustment clamp is movable to the locking position.

5. The tool module of claim 3, wherein the clamp locking surface and the base locking surface have scalloped shapes.

6. The tool module of claim 2, wherein the at least one fastener is tightenable to move the clamp body toward the locking position.

7. The tool module of claim 2, wherein the at least one fastener is loosenable to permit the at least one biasing device to move the clamp body toward the release position.

8. The tool module of claim 2, wherein the at least one biasing device is a compression spring disposed between the clamp body and the rotatable portion of the clamshell.

9. The tool module of claim 1, further comprising:
a feed nut supported by the tool slide; and
a feed screw rotatably supported by the feed nut and being rotatable to translate the feed nut and the tool slide along the linear movement track.

10. The tool module of claim 9, wherein the tool slide includes a feed nut recess in which the feed nut is supported, the feed nut recess having an open face, and wherein the tool module further comprises a feed nut bracket disposed proximate the feed nut and within the linear movement track, the feed nut bracket extending across the open face of the feed nut recess.

11. The tool module of claim 1, wherein the linear movement track is defined by:
an integral sidewall of the base, the integral sidewall including an angled surface;
a gib detachably supported by the base, the gib including an angled surface; and wherein the tool slide includes a dovetail portion disposed within the linear movement track and engaging the angled surfaces of the integral sidewall and the gib.

12. The tool module of claim 1, wherein an interface between the module base and the tool slide including the linear movement track is defined by a single-angle dovetail joint formed by:
a first angled surface of the module base;
a second angled surface of the module base opposite the first angled surface; and
a dovetail portion of the tool slide disposed between and engaging the angled surfaces of the module base.

13. A portable apparatus for machining a workpiece, comprising:
a stationary portion configured to connect to and extend around the workpiece;
a rotatable portion rotatably supported by the stationary portion and configured to extend around the workpiece;
at least a first adjustment clamp supported by the rotatable portion, the first adjustment clamp having a clamp locking surface;
a module base supported by the first adjustment clamp and defining a linear movement slot, the module base having a base locking surface, the base locking surface being configured to translate with respect to the clamp locking surface between a plurality of positions; and
a tool slide configured to support a cutting tool for machining the workpiece, the tool slide being movable within the linear movement slot;
wherein the first adjustment clamp is movable from a release position to a locking position and vice versa when connected to the rotatable portion, in the release position, the first adjustment clamp permitting the base locking surface and the clamp locking surface to translate relative to each other between the plurality of positions, and in the locking position, the clamp locking surface engaging the base locking surface to inhibit the module base from moving relative to the first adjustment clamp.

14. The apparatus of claim 13, wherein the first adjustment clamp includes:
a clamp body engaging the module base in the locking position;
at least one fastener connecting the clamp body to the rotatable portion; and
at least one biasing device biasing the clamp body toward the release position.

15. The apparatus of claim 14, wherein the clamp body includes the clamp locking surface, and wherein the clamp locking surface and the base locking surface overlap at distinct locations of the module base relative to the first adjustment clamp to provide distinct locations at which the first adjustment clamp is movable to the locking position.

16. The apparatus of claim 13, further comprising a second adjustment clamp supported by the rotatable portion, wherein the first adjustment clamp and the second adjustment clamp engage opposite sides of the module base.

17. The apparatus of claim 13, wherein the tool slide includes a feed nut recess having an open face, and further comprising:
a feed nut supported in the feed nut recess;
a feed screw rotatably supported by the feed nut and being rotatable to translate the feed nut and the tool slide along the linear movement slot; and
a feed nut bracket disposed proximate the feed nut and within the linear movement slot, the feed nut bracket extending across the open face of the feed nut recess.

18. A tool module for a machining apparatus, the machining apparatus including a clamshell having a stationary portion rotatably supporting a rotatable portion, the tool module comprising:
a module base supported by the rotatable portion of the clamshell and defining a linear movement slot;
a tool slide configured to support a cutting tool and being movable within the linear movement slot, the tool slide defining a feed nut recess having an open face;
a feed nut supported in the feed nut recess;
a feed screw rotatably supported by the feed nut and being rotatable to translate the feed nut and the tool slide within the linear movement slot; and
a feed nut bracket disposed proximate the feed nut and within the linear movement slot, the feed nut bracket extending across the open face of the feed nut recess to reinforce the tool slide.

19. The tool module of claim 18, wherein an interface between the module base and the tool slide including the linear movement slot is defined by a dovetail joint formed by:
a first angled surface of the module base;
a second angled surface of the module base opposite the first angled surface; and a dovetail portion of the tool slide disposed between and engaging the angled surfaces of the module base.

20. The tool module of claim 18, wherein the feed nut bracket is detachably supported by the tool slide.

* * * * *